(12) United States Patent
Tsunogae et al.

(10) Patent No.: US 9,045,617 B2
(45) Date of Patent: Jun. 2, 2015

(54) RING-OPENING POLYMER OF CYCLOPENTENE AND METHOD OF PRODUCTION OF SAME

(75) Inventors: Yasuo Tsunogae, Tokyo (JP); Yoshihisa Takeyama, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 434 days.

(21) Appl. No.: 13/521,262

(22) PCT Filed: Jan. 14, 2011

(86) PCT No.: PCT/JP2011/050499
§ 371 (c)(1),
(2), (4) Date: Jul. 10, 2012

(87) PCT Pub. No.: WO2011/087071
PCT Pub. Date: Jul. 21, 2011

(65) Prior Publication Data
US 2012/0289646 A1 Nov. 15, 2012

(30) Foreign Application Priority Data
Jan. 14, 2010 (JP) .................................. 2010-005994

(51) Int. Cl.
C08F 232/04 (2006.01)
C08K 3/04 (2006.01)
C08K 3/36 (2006.01)
C08F 4/78 (2006.01)
C08L 7/00 (2006.01)

(52) U.S. Cl.
CPC .......... *C08K 3/04* (2013.01); *C08G 2261/3321* (2013.01); *C08G 2261/418* (2013.01); *C08K 3/36* (2013.01)

(58) Field of Classification Search
USPC .............................. 526/308, 90, 159; 524/525
See application file for complete search history.

(56) References Cited

U.S. PATENT DOCUMENTS

| 3,790,544 A | 2/1974 | Maertens et al. |
|---|---|---|
| 3,790,545 A | 2/1974 | Minchak |
| 3,920,715 A | 11/1975 | Streck et al. |
| 3,945,986 A | 3/1976 | Ofstead |
| 3,974,094 A | 8/1976 | Streck et al. |
| 4,010,113 A | 3/1977 | Ofstead |
| 4,990,479 A | 2/1991 | Ishimaru et al. |
| 5,291,093 A | 3/1994 | Lee |
| 5,438,110 A | 8/1995 | Ishimaru et al. |
| 8,404,785 B2 | 3/2013 | Tanaka et al. |
| 2002/0082348 A1* | 6/2002 | Okuno et al. ............... 525/107 |

FOREIGN PATENT DOCUMENTS

| CN | 1040379 A | 3/1990 |
|---|---|---|
| CN | 1040379 A | 10/1998 |
| CN | 101600737 A | 12/2009 |
| EP | 2001953 A1 | 12/2008 |
| JP | 47-000597 A | 1/1972 |
| JP | 47-018991 A | 9/1972 |
| JP | 48-001387 A | 1/1973 |
| JP | 49-038999 A | 4/1974 |
| JP | 49-041494 A | 4/1974 |
| JP | 49-041495 A | 4/1974 |
| JP | 50-130900 A | 10/1975 |

OTHER PUBLICATIONS

International Search Report of PCT/JP2011/050499, mailing date Apr. 26, 2011.
Dall'asta, Gino, "Preparation and Properties of Polyalkenamers", Rubber Chemistry and Technology, 1975, pp. 511-596, vol. 47.
Office Action dated Dec. 4, 2013, issued in Chinese application No. 201180013798.8.

\* cited by examiner

*Primary Examiner* — Ling Choi
*Assistant Examiner* — Chun-Cheng Wang
(74) *Attorney, Agent, or Firm* — Westerman, Hattori, Daniels & Adrian, LLP

(57) ABSTRACT

There is provided a ring-opening polymer of cyclopentene wherein a cis ratio of the cyclopentene-derived structural units is 30% or more, a weight average molecular weight (Mw) is 100,000 to 1,000,000, and a functional group containing a structure represented by the general formula (1) or (2) is included at an end of the polymer chain.

—Y—H    (1)

(in the above general formula (1), Y represents an oxygen atom or a sulfur atom.)

—NH-Q    (2)

(in the above general formula (2), Q represents a hydrogen atom or a hydrocarbon group or a silyl group which may have a substituent group.)

10 Claims, No Drawings

RING-OPENING POLYMER OF CYCLOPENTENE AND METHOD OF PRODUCTION OF SAME

TECHNICAL FIELD

The present invention relates to a ring-opening polymer of cyclopentene and a method for producing the same. More specifically, it relates to a ring-opening polymer of cyclopentene having an excellent rubber property at low temperature, a low heat generation property, and excellent processability and a method for producing the same. The present invention also relates to a rubber composition which is obtained by using the ring-opening polymer of cyclopentene.

BACKGROUND ART

It is generally known that cyclopentene can give an unsaturated linear ring-opening polymer by metathesis ring opening polymerization in the presence of a so-called Ziegler-Natta catalyst consisting of a compound of a transition metal belonging to Group 6 in the Periodic Table like $WCl_6$ and $MoCl_5$ and an organometallic activating agent like triisobutyl aluminum, diethyl aluminum chloride, and tetrabutyl tin.

Conventionally, as the ring-opening polymer of cyclopentene obtained by the process described above, a ring-opening polymer of cyclopentene having a high trans ratio is used from the view point of having crystallinity and excellent green strength. However, although the ring-opening polymer of cyclopentene having a high trans ratio has excellent green strength and wear resistance, due to high crystallinity, it has a poor rubber property at low temperature, and therefore there has been a problem that it cannot be used for various rubbers that are used at low temperature, for example, a rubber material for a tire.

In this connection, a method of lowering crystallinity and improving the rubber property at low temperature of the ring-opening polymer of cyclopentene by increasing the cis ratio of the ring-opening polymer of cyclopentene has been studied. For example, according to Non-Patent Document 1, a ring-opening polymer of cyclopentene having a high cis ratio, non-crystallinity, and glass transition temperature of −100° C. or less is obtained by using $MoCl_5$/triethyl aluminum or $WCl_6$/trialkyl aluminum as a polymerization catalyst.

Meanwhile, it is recently required for a rubber material for a tire, for example, to have excellent cloud resistance, i.e., low heat generation property, to satisfy the low fuel requirements for an automobile. As a method for improving the low heat generation property of a rubber material, a method of adding a filler like silica or carbon black to a rubber material for providing a rubber composition is employed in general. Although the ring-opening polymer of cyclopentene disclosed in Non-Patent Document 1 has low dispersity for a filler like silica and carbon black and thus has an improved property at low temperature, it has a problem that the low heat generation property is poor. Further, since the ring-opening polymer of cyclopentene disclosed in Non-Patent Document 1 has low Moony viscosity, which makes the kneading at high temperature difficult, and therefore there is a problem that the processability is poor.

PRIOR ART DOCUMENTS

Non-Patent Documents

Non-Patent Document 1: Rubber Chemistry and Technology Vol. 47, pp 511-596, 1975

DISCLOSURE OF THE INVENTION

Problem to be Solved by the Invention

Object of the present invention is to provide a ring-opening polymer of cyclopentene having an excellent rubber property at low temperature, a low heat generation property, and excellent processability and method for producing the same. Another object of the present invention is to provide a rubber composition which is obtained by using the ring-opening polymer of cyclopentene.

Means for Solving the Problems

The inventors of the present invention conducted intensive studies to achieve the purpose described above, and as a result found that, by having the ring-opening polymer of cyclopentene in which the cis ratio of cyclopentene-derived structural units is 30% or more and the weight average molecular weight (Mw) is 100,000 to 1,000,000, and by introducing a certain active hydrogen-containing functional group to an end of the polymer chain, the purpose can be achieved, and completed the present invention accordingly.

Specifically, According to the present invention, there is provided a ring-opening polymer of cyclopentene, wherein a cis ratio of cyclopentene-derived structural units is 30% or more, the weight average molecular weight (Mw) is 100,000 to 1,000,000, and a functional group containing a structure represented by the following general formula (1) or (2) is included at an end of the polymer chain.

(in the above general formula (1), Y represents an oxygen atom or a sulfur atom.)

(in the above general formula (2), Q represents a hydrogen atom or a hydrocarbon group or a silyl group which may have a substituent group.)

Preferably, the functional group is a hydroxy group, an amino group, or a monoarylamino group.

Also, according to the present invention, there is provided a method for producing the above ring-opening polymer of cyclopentene wherein a ring-opening polymer of cyclopentene is obtained by ring opening polymerization of cyclopentene by using a polymerization catalyst (A) containing, as a main catalyst, a compound (a1) of a transition metal belonging to Group 6 in the Periodic Table in the presence of a reactant (B) of an olefin compound (b1) having at least one substituent group selected from a functional group containing the structure represented by the general formula (1), a functional group containing the structure represented by the general formula (2), and an epoxy group, and an alkyl aluminum (b2) and, after the polymerization, terminating the polymerization reaction with alcohol or water.

In the method of production of the present invention, it is also possible that the polymerization catalyst (A) preferably further contains an organoaluminum compound (a2) containing alkoxy group represented by the following general formula (3).

(in the above general formula (3), $R^1$ and $R^2$ represent a hydrocarbon group having 1 to 20 carbon atoms and x satisfies the requirement $0<x<3$.)

Also, according to the present invention, there is provided a rubber composition obtained by adding a filler to the above ring-opening polymer of cyclopentene. Preferably, the filler is silica and/or carbon black.

Effects of the Invention

According to the present invention, a ring-opening polymer of cyclopentene having an excellent rubber property at low temperature, a low heat generation property, and excellent processability and a rubber composition which is obtained by using the ring-opening polymer of cyclopentene are provided. In particular, according to the present invention, by having a ring-opening polymer of cyclopentene in which a cis ratio of cyclopentene-derived structural units and the weight average molecular weight (Mw) are within the above range and the certain active hydrogen-containing functional group described above is included at an end of the polymer chain, excellent processability (in particular, Mooney viscosity) can be obtained as well as the rubber property at low temperature and low heat generation property.

DESCRIPTION OF EMBODIMENTS (Ring-Opening Polymer of Cyclopentene)

The ring-opening polymer of cyclopentene of the present invention is a ring-opening polymer of cyclopentene in which a cis ratio of cyclopentene-derived structural units is 30% or more, the weight average molecular weight (Mw) is 100,000 to 1,000,000, and a functional group containing a structure represented by the following general formula (1) or (2) is included at an end of the polymer chain.

(in the above general formula (1), Y represents an oxygen atom or a sulfur atom.)

(in the above general formula (2), Q represents a hydrogen atom or a hydrocarbon group or a silyl group which may have a substituent group.)

In the ring-opening polymer of cyclopentene of the present invention, a cis ratio of cyclopentene-derived structural units is 30% or more, preferably 35% or more, and more preferably 40% or more. By having the cis ratio of cyclopentene-derived structural units within the above range, the ring-opening polymer of cyclopentene can have a non-crystalline property and an excellent rubber property at low temperature. If the cis ratio is too low, it has crystallinity at low temperature (for example, −30° C. or less), and thus the rubber property at low temperature deteriorates. Further, as used herein, the expression 'cis ratio of cyclopentene-derived structural units' indicates percentage of structural units derived from cyclopentene in which the carbon-carbon double bond is cis form in the entire structural units derived from cyclopentene which constitute the ring-opening polymer of cyclopentene, and it can be determined by $^{13}$C-NMR spectrum measurement of the ring-opening polymer of cyclopentene.

Further, the upper limit of the cis ratio of cyclopentene-derived structural units of the ring-opening polymer of cyclopentene of the present invention is, although not specifically limited, generally 95% or less, preferably 90% or less, and more preferably 85% or less. The ring-opening polymer of cyclopentene having excessively high cis ratio is difficult to be produced and it may have a poor rubber property at low temperature.

The ring-opening polymer of cyclopentene of the present invention has weight average molecular weight (Mw) of 100,000 to 1,000,000, preferably 120,000 to 900,000, and more preferably 150,000 to 800,000. If the molecular weight is excessively low, the rubber property deteriorates, and therefore undesirable. On the other hand, if the molecular weight is excessively high, production and handling are difficult to be performed. Further, the molecular weight distribution (Mw/Mn) that is obtained as the ratio between the number average molecular weight (Mn) and the weight average molecular weight (Mw) of the ring-opening polymer of cyclopentene is, although not specifically limited, generally 1.1 to 5.0, preferably 1.2 to 4.5, and more preferably 1.3 to 4.0. Further, the weight average molecular weight (Mw) or the molecular weight distribution (Mw/Mn) of the ring-opening polymer of cyclopentene is determined in terms of polystyrene by gel permeation chromatography.

Further, the ring-opening polymer of cyclopentene of the present invention has a functional group containing a structure represented by the following general formula (1) or (2) at an end of the polymer chain. Both the functional group represented by the following general formula (1) and the functional group containing a structure represented by the following general formula (2) are a heteroatom-containing functional group which contains an active hydrogen. Herein below, the functional group containing a structure represented by the following general formula (1) or (2) is appropriately referred to as an "active hydrogen-containing functional group."

(in the above general formula (1), Y represents an oxygen atom or a sulfur atom.)

(in the above general formula (2), Q represents a hydrogen atom or a hydrocarbon group or a silyl group which may have a substituent group.)

According to the present invention, by having a ring-opening polymer of cyclopentene in which a cis ratio of cyclopentene-derived structural units and the weight average molecular weight (Mw) are within the above range and the active hydrogen-containing functional group is introduced to an end of the polymer chain, excellent processability (in particular, Mooney viscosity) can be obtained as well as the rubber property at low temperature and low heat generation property.

The functional group containing a structure represented by the following formula (1) is —OH (hydroxy group) or —SH (thiol group). Of these, the hydroxy group is preferable.

Further, in the general formula (2), Q represents a hydrogen atom or a hydrocarbon group or a silyl group which may have a substituent group. For example, as the hydrocarbon group having a substituent group, a group having a carbonyl group, an ether bond and/or a thioether bond etc. may be mentioned. As the silyl group having a substituent group, a group having an alkyl group and/or an alkoxy group etc. may be mentioned.

Among the functional groups containing the chemical structure represented by the formula (2), from the view point of having excellent balance between an effect of enhancing affinity of the obtained ring-opening polymer of cyclopentene with silica or carbon black and an influence on polymerization activity, an amino group (—NH$_2$); an monoalkylamide group such as methylamino group, ethylamino group, n-butylamino group, and i-butylamino group; a monoarylamino group such as anilino group; and an amide group such as acetamide group, and acrylamide group; etc. may be mentioned preferably. Of these, an amino group and a monoarylamino group are preferable.

Introduction ratio of the active hydrogen-containing functional group at an end of the polymer chain of the ring-opening polymer of cyclopentene of the present invention is, although not specifically limited, preferably 10% or more, more preferably 20% or more, furthermore preferably 30% or more, and particularly preferably 40% or more in terms of the ratio of the number of introduced active hydrogen-containing functional group to the number of polymer chains of the ring-opening polymer of cyclopentene. Higher introduction ratio of the active hydrogen-containing functional group is more preferable in that better affinity with silica or carbon black as a filler used for producing a rubber material for a tire is obtained and, as a result, the higher effect of enhancing the low heat generation property is obtained. Further, as for the method of measuring the introduction ratio of the active hydrogen-containing functional group to an end of the polymer chain, although not specifically limited, it can be determined from peak area ratio which corresponds to the active hydrogen-containing functional group obtained by $^1$H-NMR spectrum measurement and the number average molecular weight in terms of polystyrene obtained by gel permeation chromatography.

Further, the ring-opening polymer of cyclopentene of the present invention may contain, in addition to the cyclopentene-derived structural units, cyclic olefin-derived structural units which have a metathesis reactivity other than cyclopentene. However, from the view point of lowering the glass transition temperature of the ring-opening polymer of cyclopentene and consequently keeping the rubber property at low temperature at low level, the content ratio of the cyclopentene-derived structural units is preferably 90 mol % or more, more preferably 95 mol % or more, and furthermore preferably 97 mol % or more. If the content ratio of the cyclopentene-derived structural units is excessively low, glass transition temperature of the ring-opening polymer of cyclopentene becomes higher, and as a result, not only the rubber property at low temperature deteriorates but also the characteristic of the ring-opening polymer of cyclopentene (for example, characteristic as a liner polymer having no short chain branch) is lost, and therefore undesirable.

Mooney viscosity ($ML_{1+4}$, 100° C.) of the ring-opening polymer of cyclopentene of the present invention is preferably 20 to 150, more preferably 22 to 120, and furthermore preferably 25 to 100. Since the ring-opening polymer of cyclopentene of the present invention has the cis ratio of cyclopentene-derived structural units and weight average molecular weight (Mw) that are within the ranges described above and also has the active hydrogen-containing functional group at an end of the polymer chain, Mooney viscosity is controlled to the above range, and as a result, excellent processability is provided. If Mooney viscosity is excessively low, kneading at high temperature is difficult to be achieved, and as a result, the processability deteriorates. On the other hand, if Mooney viscosity is excessively high, it is difficult to perform the kneading so that the processability also deteriorates.

From the view point of having good rubber property at low temperature, the glass transition temperature of the ring-opening polymer of cyclopentene of the present invention is preferably −98° C. or less, more preferably −99° C. or less, and furthermore preferably −100° C. or less, although it is not specifically limited. Since the ring-opening polymer of cyclopentene of the present invention has a cis ratio of cyclopentene-derived structural units and the weight average molecular weight (Mw) that are within the ranges described above, the glass transition temperature can be controlled to the above level.

(Method for Producing the Ring-Opening Polymer of Cyclopentene)

The ring-opening polymer of cyclopentene of the present invention is produced by ring opening polymerization of cyclopentene by using the polymerization catalyst (A) containing, as a main catalyst, the compound (a1) of a transition metal belonging to Group 6 in the Periodic Table in the presence of the reactant (B) of the specific olefin compound (b1) and the alkyl aluminum (b2) described below and terminating the polymerization reaction with alcohol or water.

(Polymerization Catalyst (A))

The polymerization catalyst (A) used for the Method of production of the present invention contains, as a main catalyst, the compound (a1) of a transition metal belonging to Group 6 in the Periodic Table.

The compound (a1) of a transition metal belonging to Group 6 in the Periodic Table is a compound having a Group 6 transition metal atom of the Periodic Table (long form of the Periodic Table, ditto for the following). Specifically, it is a compound containing a chrome atom, a molybdenum atom, or a tungsten atom. A compound containing a molybdenum atom or a tungsten atom is preferable. From the view point of having high solubility in cyclopentene, a compound containing a tungsten atom is more preferable. The compound (a1) of a transition metal belonging to Group 6 in the Periodic Table is not specifically limited if it is a compound containing a transition metal atom belonging to Group 6 in the Periodic Table. As examples thereof, a halide, an alcoholate, an arylate, an oxide, and an imide compound of a transition metal atom belonging to Group 6 in the Periodic Table etc. may be mentioned. Of these, from the view point of having high polymerization activity, the halide is preferable.

As specific examples of the compound (a1) of a transition metal belonging to Group 6 in the Periodic Table, a molybdenum compound such as molybdenum pentachloride, molybdenum oxotetrachloride, and molybdenum(phenylimide)tetrachloride; and a tungsten compound such as tungsten hexachloride, tungsten oxotetrachloride, tungsten(phenylimide)tetrachloride, monocathecolate tungsten tetrachloride, bis(3,5-ditertiarybutyl)cathecolate tungsten dichloride, bis(2-chloroetherate)tetrachloride, and tungsten oxotetraphenolate; etc. may be mentioned.

The use amount of the compound (a1) of a transition metal belonging to Group 6 in the Periodic Table is, in terms of molar ratio of "a transition metal atom belonging to Group 6 in the polymerization catalyst:cyclopentene", generally in the range of 1:100 to 1:200,000, preferably 1:200 to 1:150,000, and more preferably 1:500 to 1:100,000. If the use amount of the compound (a1) of a transition metal belonging to Group 6 in the Periodic Table is excessively low, the polymerization reaction may not progress to sufficient level. On the other hand, if it is excessively high, it may be difficult to remove the catalyst residues from the ring-opening polymer of cyclopentene to be obtained, and therefore the heat resistance and cold resistance of the ring-opening polymer of cyclopentene to be obtained may be lowered.

Further, it is preferable that the polymerization catalyst (A) used for the Method of production of the present invention contains, in addition to the compound (a1) of a transition metal belonging to Group 6 in the Periodic Table described above, an organoaluminum compound (a2) containing alkoxy group represented by the following general formula (3). By using the organoaluminum compound (a2) containing alkoxy group as co-catalyst, the cis ratio of cyclopentene-derived structural units of the ring-opening polymer of cyclopentene to be obtained can be increased.

$$(R^1)_{3-x}Al(OR^2)_x \tag{3}$$

In the above general formula (3), $R^1$ and $R^2$ represent a hydrocarbon group having 1 to 20 carbon atoms, preferably a hydrocarbon group having 1 to 10 carbon atoms.

As specific examples of $R^1$ and $R^2$, an alkyl group such as methyl group, ethyl group, isopropyl group, n-propyl group, isobutyl group, n-butyl group, t-butyl group, n-hexyl group, cyclohexyl group, n-octyl group, and n-decyl group; and an aryl group such as phenyl group, 4-methylphenyl group, 2,6-dimethylphenyl group, 2,6-diisopropylphenyl group, and naphthyl group; etc. may be mentioned. Further, although $R^1$ and $R^2$ may be the same or different from each other, from the view point that cis ratio of the ring-opening polymer of cyclopentene to be obtained can be increased, at least $R^2$ of $R^1$ and $R^2$ is preferably an alkyl group consisting of sequentially bonded four or more carbon atoms. Particularly, n-butyl group, 2-methyl-pentyl group, n-hexyl group, cyclohexyl group, n-octyl group, or decyl group are preferable.

Further, in the general formula (3), x satisfies the requirement $0<x<3$. Specifically, although the composition ratio of $R^1$ and $OR^2$ in the general formula (3) may have any value which satisfies $0<3-x<3$ and $0<x<3$, respectively, from the view point that the polymerization activity can be enhanced and also the cis ratio of the ring-opening polymer of cyclopentene to be obtained can be improved, x preferably satisfies the requirement $0.5<x<1.5$.

The organoaluminum compound (a2) containing alkoxy group represented by the general formula (3) can be synthesized based on the reaction between trialkyl aluminum and alcohol as shown in the following general formula (4), for example.

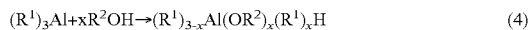

$$(R^1)_3Al + xR^2OH \rightarrow (R^1)_{3-x}Al(OR^2)_x(R^1)_xH \qquad (4)$$

Further, in the above general formula (3), x can be arbitrarily controlled by adjusting the reaction ratio between the trialkyl aluminum and alcohol as shown in the above general formula (4).

Use amount of the organoaluminum compound (a2) containing alkoxy group varies depending on the type of the organoaluminum compound (a2) containing alkoxy group used. It is preferably 0.1 to 10 time mol, more preferably 0.2 to 8 time mol, and furthermore preferably 0.5 to 5 time mol with respect to the transition metal atom belonging to Group 6 in the Periodic Table which constitutes the compound (a1) of a transition metal belonging to Group 6 in the Periodic Table. If the use amount of the organoaluminum compound (a2) containing alkoxy group is excessively small, the polymerization activity may become insufficient. On the other hand, if it is excessively high, there is a tendency that a side reaction easily occurs during the ring opening polymerization.

Further, the polymerization catalyst (A) used for the method for production of the present invention may contain, in addition to the compound (a1) of a transition metal belonging to Group 6 in the Periodic Table and the organoaluminum compound (a2) containing alkoxy group, the oxygen atom-containing hydrocarbon compound (a3). By further containing the oxygen atom-containing hydrocarbon compound (a3), not only the polymerization activity is improved but also the molecular weight of the ring-opening polymer of cyclopentene to be obtained can be increased. The oxygen atom-containing hydrocarbon compound (a3) is not specifically limited if it is a hydrocarbon compound in which an oxygen atom is contained. An ester, ketone, or ether compound having 2 to 30 carbon atoms which may have a halogen atom as a substituent group is preferable. From the view point of having an excellent effect of enhancing polymerization activity at room temperature or above and obtaining high molecular weight, an ester, ketone, or ether compound having 4 to 10 carbon atoms is preferable. Further, the ester, ketone, or ether compound may be a cyclic ester, ketone, or ether. Still further, it may be a compound containing two or more ester bonds, ketone bonds, or ether bonds in one molecule.

As specific examples of the ester compound, ethyl acetate, butyl acetate, amyl acetate, octyl acetate, 2-chloroethyl acetate, methyl acetyl acrylate, ε-caprolactone, dimethyl glutarate, σ-hexanolactone, and diacetoxyethane etc. may be mentioned.

As specific examples of the ketone compound, acetone, ethyl methyl ketone, acetyl acetone, acetophenone, cyclohexyl phenyl ketone, 1'-acetonaphthone, methyl 2-acetylbenzoate, and 4'-chloroacetophenone etc. may be mentioned.

As specific examples of the ether compound, diethyl ether, tetrahydrofuran, 1,2-dimethoxyethane, ethylene glycol diethyl ether, and 1,4-dioxane etc. may be mentioned.

When the oxygen atom-containing hydrocarbon compound (a3) is used, the use amount thereof varies depending on the type of the oxygen atom-containing hydrocarbon compound(a3). However, it is preferably 0.1 to 10 time mol, more preferably 0.2 to 8 time mol, and furthermore preferably 0.5 to 5 time mol with respect to the transition metal atom belonging to Group 6 in the Periodic Table which constitutes the compound (a1) of a transition metal belonging to Group 6 in the Periodic Table. If the use amount of oxygen atom-containing hydrocarbon compound (a3) is excessively small, there is a tendency that the effect expected from addition of the oxygen atom-containing hydrocarbon compound (a3) is difficult to obtain. On the other hand, if it is excessively high, the polymerization activity may become insufficient.

(Reactant (B) of the Olefin Compound (b1) and the Alkyl Aluminum (b2))

When performing ring opening polymerization of cyclopentene of the present invention, the reactant (B) of the olefin compound (b1) and the alkyl aluminum (b2) is used as wells as the polymerization catalyst (A) described above.

With regard to the olefin compound (b1) and the alkyl aluminum (b2) which constitute the reactant (B), the olefin compound (b1) is a compound which has at least one substituent group selected from a functional group containing the structure represented by the general formula (1), a functional group containing the structure represented by the general formula (2), and an epoxy group and has an olefinic carbon-carbon double bond. By using the olefin compound (b1), it is possible to introduce the active hydrogen-containing functional group at an end of the polymer chain of the ring-opening polymer of cyclopentene.

As the olefin compound (b1), for example, the compounds that are represented by the following formulae (5) to (10) may be mentioned.

[Chemical formula 1]

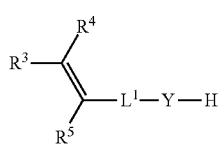

(5)

(in the above general formula (5), $R^3$ to $R^5$ represent a hydrogen atom or a hydrocarbon group having 1 to 10 carbon atoms, Y represents an oxygen atom or a sulfur atom, and $L^1$ represents a single bond or a divalent group.)

[Chemical formula 2]

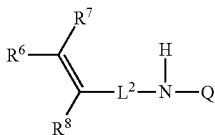

(6)

(in the above general formula (6), $R^6$ to $R^8$ represent a hydrogen atom or a hydrocarbon group having 1 to 10 carbon atoms, Q represents a hydrogen atom or a hydrocarbon group or a silyl group which may have a substituent group, and $L^2$ represent a single bond or a divalent group.)

[Chemical formula 3]

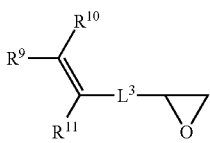

(7)

(in the above general formula (7), $R^9$ to $R^{11}$ represent a hydrogen atom or a hydrocarbon group having 1 to 10 carbon atoms and $L^3$ represents a single bond or a divalent group.)

[Chemical formula 4]

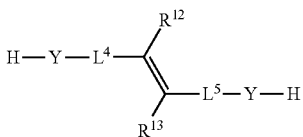

(8)

(in the above general formula (8), $R^{12}$ and $R^{13}$ represent a hydrogen atom or a hydrocarbon group having 1 to 10 carbon atoms, Y represents an oxygen atom or a sulfur atom, and $L^4$ and $L^5$ represent a single bond or a divalent group.)

[Chemical formula 5]

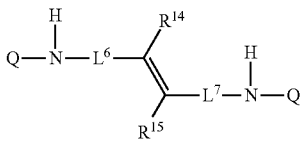

(9)

(in the above general formula (9), $R^{14}$ and $R^{15}$ represent a hydrogen atom or a hydrocarbon group having 1 to 10 carbon atoms, Q represents a hydrogen atom or a hydrocarbon group or a silyl group which may have a substituent group, and $L^6$ and $L^7$ represent a single bond or a divalent group.)

[Chemical formula 6]

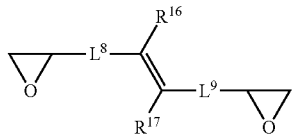

(10)

(in the above general formula (10), $R^{16}$ and $R^{17}$ represent a hydrogen atom or a hydrocarbon group having 1 to 10 carbon atoms and $L^8$ and $L^9$ represent a single bond or a divalent group.)

In the above formulae (5) to (10), $R^3$ to $R^{17}$ are preferably a hydrogen atom. When $R^3$ to $R^{17}$ are a hydrogen atom, the olefin compound (b1) with more favorable metathesis reactivity can be provided.

Further, in the above formulae (5) to (10), as the divalent group as $L^1$ to $L^9$, although not specifically limited, a divalent group such as a hydrocarbon group, a carbonyl group, an ester group, an ether group, a silyl group, a thioether group, an amino group, and an amide group which may have any substituent group, and a group which is obtained as combination of them may be mentioned. Further, the olefinic carbon-carbon double bond with —Y—H, —NH-Q, or an epoxy group may have a constitution consisting of a direct single bond instead of being mediated by a divalent group. From the view point of obtaining the olefin compound (b1) with more favorable metathesis reactivity, $L^1$ to $L^9$ are preferably a divalent group. Among them, it is preferably a divalent group selected from a hydrocarbon group, an ether group, an imino group, an alkylimino group, or a group which is obtained as combination of them. More preferably, it is an aliphatic hydrocarbon group having 1 to 20 carbon atoms, an aromatic hydrocarbon group having 6 to 20 carbon atoms, or a group containing an ether group having 1 to 20 carbon atoms.

Further, when the compound represented by the formula (5), (7) is used among the compounds represented by the formulae (5) to (10), a functional group containing a structure represented by the formula (1) can be introduced to only one end of the ring-opening polymer of cyclopentene based on the metathesis reaction of a reactant of the compound and alkyl aluminum followed by hydrolysis with alcohol or water. Further, when the compound represented by the formula (8), (10) is used, a functional group containing a structure represented by the formula (1) can be introduced to both ends of the ring-opening polymer of cyclopentene based on the metathesis reaction of a reactant of the compound and alkyl aluminum followed by hydrolysis with alcohol or water.

Further, when the compound represented by the formula (6) is used, a functional group containing a structure represented by the formula (2) can be introduced to only one end of the ring-opening polymer of cyclopentene based on the metathesis reaction of a reactant of the compound and alkyl aluminum followed by hydrolysis with alcohol or water. Further, when the compound represented by the formula (9) is used, a functional group containing a structure represented by the formula (2) can be introduced to both ends of the ring-opening polymer of cyclopentene based on the metathesis reaction of a reactant of the compound and alkyl aluminum followed by hydrolysis with alcohol or water.

As specific examples of the preferred compound represented by the general formula (5), an olefin compound containing a hydroxy group such as allyl alcohol, 3-buten-1-ol, 4-penten-1-ol, 4-hexen-1-ol, 4-hepten-1-ol, 5-decen-1-ol, 5-hexen-1-ol, 5-octen-1-ol, 6-hepten-1-ol, 4-hydroxystyrene, 2-allyl phenol, 4-allyl hydroxybenzoate, 1-cyclohexyl-2-buten-1-ol, ethylene glycol monoallyl ether, and 3-allyloxy-1,2-propanediol; and an olefin compound containing a thiol group such as allyl mercaptan and styrene thiol; etc. may be mentioned.

As specific examples of the preferred compound represented by the general formula (6), an olefin compound containing an amino group such as allylamine, N-allylaniline, N-allylbenzyl amine, and 4-aminostyrene; and an olefin compound containing an amide group such as allyl urea and acrylamide; etc. may be mentioned.

As specific examples of the preferred compound represented by the general formula (7), an olefin compound containing an epoxy group such as 1,3-butadiene monoepoxide, 1,2-epoxy-5-hexene, allyl glycidyl ether, and 1,2-epoxy-9-decene etc. may be mentioned.

As specific examples of the preferred compound represented by the general formula (8), an olefin compound containing a hydroxy group such as 2-butene-1,4-diol and 3-hexen-2,5-diol; and an olefin compound containing a thiol compound such as 2-butene-1,4-dithiol; etc. may be mentioned.

As specific examples of the preferred compound represented by the general formula (9), an olefin compound containing an amino group such as 2-butene-1,4-diamine and 3-hexen-2,5-diamine; and an olefin compound containing an amide group such as fumaramide and maleamide; etc. may be mentioned.

As specific examples of the preferred compound represented by the general formula (10), an olefin compound containing an epoxy group such as 1,2,9,10-diepoxy-5-decene etc. may be mentioned.

Among the compounds described above, from the view point of having excellent balance between an effect of enhancing affinity of the ring-opening polymer of cyclopentene with silica or carbon black and an influence on polymerization activity, an olefin compound containing a hydroxy group and an olefin compound containing an amine are particularly preferable.

With regard to the olefin compound (b1) and the alkyl aluminum (b2) which constitute the reactant (B), the alkyl aluminum (b2) is not specifically limited if it is an aluminum compound having an alkyl group.

As specific examples of the alkyl aluminum (b2), trialkyl aluminum such as trimethyl aluminum, triethyl aluminum, triisobutyl aluminum, trihexyl aluminum, and trioctyl aluminum; and alkyl aluminum halide such as diethyl aluminum chloride, ethyl aluminum dichloride, and ethyl aluminum sesquichloride; etc. may be mentioned. Of these, when trialkyl aluminum is used, it reacts efficiently with the olefin compound (b1) to exhibit high polymerization activity. Further, when reacted with aluminum after treatment with alcohol or water following the polymerization, an aluminum-containing group can be easily dissociated from an end of the polymer and the active hydrogen-containing functional group can be easily obtained, and therefore desirable.

When the olefin compound (b1) and the alkyl aluminum (b2) are reacted to obtain the reactant (B), the ratio between the olefin compound (b1) and the alkyl aluminum (b2) is preferably ⅓ eq to 1 eq in terms of molar ratio the alkyl aluminum (b2) with respect to active hydrogen atom of —Y—H, active hydrogen atom of —NH-Q, or an epoxy group in the olefin compound (b1).

Further, in the metathesis reaction, the reactant (B) of the olefin compound (b1) and the alkyl aluminum (b2) functions not only as a substrate for metathesis reaction but also as a polymerization catalyst. In particular, since aluminum containing an alkoxy group is produced when a compound containing a hydroxy group is used as the olefin compound (b1), it functions as the organoaluminum compound (a2) containing alkoxy group described above.

For example, the reaction between the compound represented by the general formula (5) and trialkyl aluminum is expressed as the following formula (11).

[Chemical formula 7]

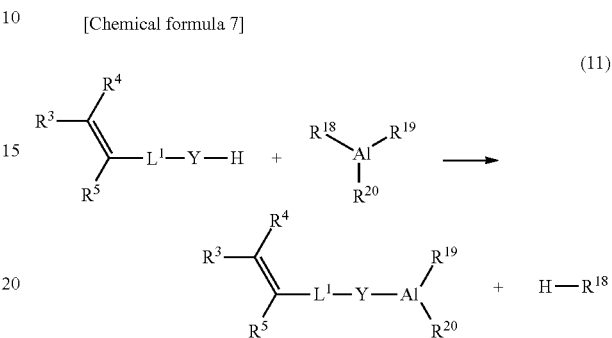

Similarly, the reaction between the compound represented by the general formula (7) and trialkyl aluminum is expressed as the following formula (12).

[Chemical formula 8]

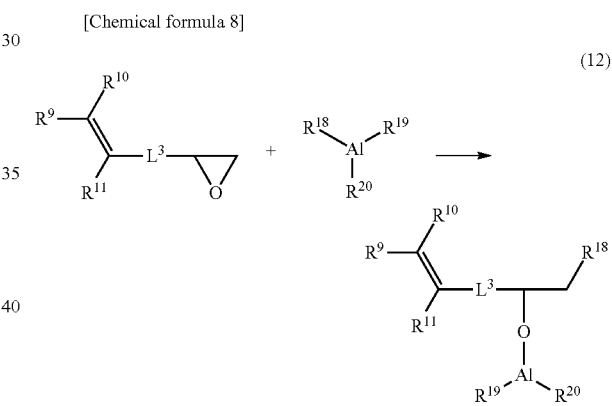

The reaction between the olefin compound (b1) and the alkyl aluminum (b2) is preferably performed in an organic solvent before the ring opening polymerization of cyclopentene. The solvent used therefore is not specifically limited, if it is a solvent inert to the polymerization reaction and capable of dissolving the olefin compound (b1) and the alkyl aluminum (b2). However, from the view point of performing the ring opening polymerization thereafter, a hydrocarbon solvent is preferably used. As specific examples of the hydrocarbon solvent, an aromatic hydrocarbon such as benzene, toluene, xylene, and ethyl benzene; an aliphatic hydrocarbon such as n-hexane, n-heptane, and n-octane; and an alicyclic hydrocarbon such as cyclohexane, cyclopentane, and methylcyclohexane; etc. may be mentioned. Further, the reaction between the olefin compound (b1) and the alkyl aluminum (b2) may be performed in the presence of cyclopentene that is used as a monomer for carrying out the ring opening polymerization.

The use amount of the olefin compound (b1) can be appropriately selected depending on the molecular weight of the ring-opening polymer of cyclopentene to be produced. In terms of molar ratio with respect to the cyclopentene, it is generally in the range of 1/100 to 1/100,000, preferably 1/200 to 1/50,000, and more preferably 1/500 to 1/10,000. Further, in addition to the function of introducing the active hydrogen-containing functional group to an end of the polymer chain of the ring-opening polymer of cyclopentene, the olefin compound (b1) functions as a molecular weight adjuster. If the use amount of the olefin compound (b1) is excessively low, the introduction ratio of the active hydrogen-containing functional group may decrease. On the other hand, if it is excessively high, molecular weight of the ring-opening polymer of cyclopentene to be obtained is lowered.

(Ring Opening Polymerization)

According to the method of production of the present invention, ring opening polymerization of cyclopentene is carried out by contacting cyclopentene with the compound (a1) of a transition metal belonging to Group 6 in the Periodic Table, the reactant (B) of the olefin compound (b1) and the alkyl aluminum (b2), and the organoaluminum compound (a2) containing alkoxy group, that is used if necessary.

The method for performing the ring opening polymerization by bringing them into contact with one another is not specifically limited. For example, ring opening polymerization of cyclopentene can be performed by adding the compound (a1) of a transition metal belonging to Group 6 in the Periodic Table in the presence of cyclopentene and the reactant (B) and the organoaluminum compound (a2) containing alkoxy group, that is used if necessary. Alternatively, it is also possible that the reactant (B), the compound (a1) of a transition metal belonging to Group 6 in the Periodic Table, and the organoaluminum compound (a2) containing alkoxy group, that is used if necessary, are mixed in advance and cyclopentene is added thereto to perform the ring opening polymerization of cyclopentene.

Further, the reactant (B) may be mixed with cyclopentene in advance or mixed with cyclopentene at the time of carrying out the ring opening polymerization. Still further, it is also possible that the ring opening polymerization of cyclopentene is carried out first and the reactant (B) is added to the ring opening-polymer obtained therefrom to perform the metathesis reaction with the ring opening-polymer.

With regard to the method for producing the ring-opening polymer of cyclopentene of the present invention, the ring opening polymerization may be carried out in the absence or presence of a solvent. If the ring opening polymerization is carried out in the presence of a solvent, the solvent used therefore is not specifically limited, if it is a solvent inert to the polymerization and capable of dissolving cyclopentene and other co-polymerizable other cyclic olefin, the polymerization catalyst (A) and the reactant (B) described above. However, a hydrocarbon solvent is preferably used. As specific examples of the hydrocarbon solvent, for example, an aromatic hydrocarbon such as benzene, toluene, xylene, and ethyl benzene; an aliphatic hydrocarbon such as n-hexane, n-heptane, and n-octane; and an alicyclic hydrocarbon such as cyclohexane, cyclopentane, and methylcyclohexane; etc. may be mentioned.

Further, according to the present invention, to introduce a branch structure to the ring-opening polymer of cyclopentene, cyclic olefin having a vinyl group and/or a compound having three or more vinyl groups may be also used for the ring opening polymerization of cyclopentene. By using cyclic olefin having a vinyl group and/or a compound having three or more vinyl groups and introducing a branch structure to the ring-opening polymer of cyclopentene, it is possible to improve the hot flow property of the ring-opening polymer of cyclopentene.

The cyclic olefin having a vinyl group is not specifically limited if it is a cyclic olefin containing at least one vinyl group. For example, monocyclic olefin having a vinyl group such as 4-vinylcyclopentene and 5-vinylcyclooctene; and norbornenes having a vinyl group such as 5-vinylnorbornene, 5-propenylnorbornene, and 5-styrylnorbornene; etc. may be mentioned.

As the compound having three or more vinyl groups, a compound having three vinyl groups such as 1,2,4-trivinylcyclohexane and 1,3,5-trivinylcyclohexane; and a compound having 4 or more vinyl groups such as divinyl benzene oligomer and 1,2-polybutadiene oligomer; etc. may be mentioned.

When the cyclic olefin having a vinyl group and/or the compound having three or more vinyl groups is used, the use amount thereof is 0.001 to 1 mol %, preferably 0.002 to 0.9 mol %, and more preferably 0.005 to 0.8 mol % with respect to the cyclopentene.

In the method for producing the ring-opening polymer of cyclopentene of the present invention, the polymerization temperature is preferably −100° C. or higher, more preferably −50° C. or higher, furthermore preferably 0° C. or higher, and particularly preferably 20° C. or higher. In addition, the upper limit of the polymerization temperature is, although not specifically limited, preferably less than 100° C., more preferably less than 90° C., furthermore preferably less than 80° C., and particularly preferably less than 70° C. According to the method of production of the present invention, since the polymerization catalyst (A) and the reactant (B) described above are used for performing the ring opening polymerization of cyclopentene, cyclopentene with high cis ratio and high molecular weight can be obtained even at relatively high temperature condition like 20° C. or higher. Further, the ring-opening polymer of cyclopentene can be obtained with high yield. If the polymerization temperature is excessively high, the ring-opening polymer of cyclopentene with excessively small molecular weight may be obtained. On the other hand, if the polymerization temperature is excessively low, the polymerization rate is slowed down, and as a result, productivity may be impaired.

The polymerization time is 1 minute to 72 hours, and more preferably 10 minutes to 20 hours.

With regard to the method for producing the ring-opening polymer of cyclopentene of the present invention, the compound (a1) of a transition metal belonging to Group 6 in the Periodic Table, the reactant (B) of the olefin compound (b1) and the alkyl aluminum (b2), and the organoaluminum compound (a2) containing alkoxy group, that is used if necessary, are brought into contact with cyclopentene to initiate the ring opening polymerization. After the polymerization conversion ratio reaches the predetermined value, an excess amount of alcohol or water is added to the polymerization system for termination, and the ring-opening polymer of cyclopentene is obtained accordingly. At that time, alcohol or water reacts with aluminum bonded to an end of a polymer so that the group containing aluminum (for example, —$AlR^{19}R^{20}$ for a case of a compound obtained with the general formula (11) or (12) described above) is dissociated from the end of the polymer, and as a result, a functional group containing a structure represented by the general formula (1) or (2) (the active hydrogen-containing functional group) can be introduced to the end of the polymer.

Further, according to the present invention, an anti-aging agent such as a phenol-based stabilizer, a phosphorus-based stabilizer, and a sulfur-based stabilizer may be added to the ring opened polymer obtained, if desired. The addition amount of the anti-aging agent may be appropriately determined based on the type of the agent or the like. Further, according to the present invention, an extender oil may be also added, if desired.

Further, when the polymerization is carried out in the presence of a solvent by using a solvent, a method for collecting the polymer from a polymer solution is not specifically limited and any method well known in the art can be employed. For example, a method including separating a solvent by steam stripping or the like, isolating the solid by filtration, and drying the solid to obtain solid state rubber can be employed.

(Rubber Composition)

The rubber composition of the present invention is obtained by adding a filler to the ring-opening polymer of cyclopentene of the present invention described above.

The filler is not specifically limited and silica and/or carbon black may be mentioned.

As specific examples of the silica as a filler, white carbon by dry method, white carbon by wet method, colloidal silica, and precipitated silica may be mentioned. Carbon-silica dual phase filler in which silica is supported on carbon black surface can be also used. Of these, white carbon by wet method containing hydrous silicic acid as a main component is preferable. The above component may be used either singly or in combination of two or more.

The silica as a filler has specific surface area by nitrogen adsorption of preferably 50 to 300 $m^2/g$, more preferably 80 to 220 $m^2/g$, and particularly preferably 100 to 170 $m^2/g$. By having the specific surface area within the range, it is possible to make the obtained rubber composition more superior in low heat generation. Further, pH of the silica is preferably less than 7 and more preferably 5 to 6.9. Further, the specific surface area by nitrogen adsorption can be measured by BET method with reference to ASTM D3037-81.

When silica is used as a filler, the addition amount of the silica is preferably 1 to 150 parts by weight, more preferably 10 to 120 parts by weight, furthermore preferably 15 to 100 parts by weight, and particularly preferably 20 to 80 parts by weight with respect to 100 parts by weight of the rubber component in the rubber composition. By having the addition amount of silica within the range, it is possible to make the rubber composition particularly superior in low heat generation. When the addition amount of silica is excessively low or high, the low heat generation property of the rubber composition may be impaired.

From the view point of further improving the low heat generation property of the rubber composition, it is preferable that a silane coupling agent is additionally added when silica is used as a filler. As the silane coupling agent, for example, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, bis(3-(triethoxysilyl)propyl)disulfide, bis(3-(triethoxysilyl)propyl) tetrasulfide, γ-trimethoxysilylpropyl dimethylthiocarbamyl tetrasulfide, and γ-trimethoxysilylpropylbenzothiazyl tetrasulfide etc. may be mentioned. Of these, from the view point of avoiding scorching during kneading, an agent with four or less sulfurs contained per one molecule is preferable. Each of the silane coupling agents may be used either singly or in combination of two or more. The addition amount of the silane coupling agent is preferably 0.1 to 30 parts by weight, and more preferably 1 to 15 parts by weight with respect to 100 parts by weight of silica.

As the carbon black as a filler, furnace black, acetylene black, thermal black, channel black, and graphite etc. may be mentioned. Of these, furnace black is preferably used and SAF, ISAF, ISAF-HS, ISAF-LS, IISAF-HS, HAF, HAF-HS, HAF-LS, T-HS, T-NS, MAF, and FEF etc. may be mentioned as specific examples thereof. Each of them may be used either singly or in combination of two or more.

The carbon black as a filler has specific surface area by nitrogen adsorption of preferably 5 to 200 $m^2/g$, more preferably 20 to 130 $m^2/g$, and furthermore preferably 40 to 80 $m^2/g$. Further, the carbon black as a filler has dibutyl phthalate (DBP) adsorption amount of preferably 5 to 200 mL/100 g, more preferably 50 to 160 mL/100 g, and furthermore preferably 70 to 130 mL/100 g. When carbon black has the specific surface area and dibutyl phthalate adsorption amount within the range, it is possible to make the rubber composition have good moldability and an excellent low heat generation property.

When carbon black is used as a filler, the addition amount thereof is preferably 1 to 150 parts by weight, more preferably 2 to 120 parts by weight, furthermore preferably 15 to 100 parts by weight, and particularly preferably 30 to 80 parts by weight with respect to 100 parts by weight of the rubber component in the rubber composition. By having the addition amount of carbon black within the range, it is possible to make the rubber composition particularly superior in low heat generation. When the addition amount of carbon black is excessively low or high, the low heat generation property of the rubber composition may be impaired.

Further, when both the silica and carbon black are added to the rubber composition of the present invention, total amount of the silica and carbon black is preferably 25 to 120 parts by weight and more preferably 30 to 100 parts by weight per 100 parts by weight with respect to the rubber component in the rubber composition.

The rubber composition of the present invention preferably contains, as a rubber component, additional rubber other than the ring-opening polymer of cyclopentene of the present invention described above. As the additional rubber, natural rubber, polyisoprene rubber, emulsion polymerization styrene-butadiene copolymerization rubber, solution polymerization styrene-butadiene copolymerization rubber, polybutadiene rubber (it may be also polybutadiene rubber containing crystalline fiber consisting of 1,2-polybutadiene polymer), styrene-isoprene copolymerization rubber, butadiene-isoprene copolymerization rubber, styrene-isoprene-butadiene copolymerization rubber, acrylonitrile-butadiene copolymerization rubber, and acrylonitrile-styrene-butadiene copolymerization rubber etc. may be mentioned. Of these, natural rubber, polyisoprene rubber, polybutadiene rubber, and styrene-butadiene copolymerization rubber are preferably used. Each of them may be used either singly or in combination of two or more.

When the rubber composition of the present invention is added with additional rubber other than the ring-opening polymer of cyclopentene, content ratio of the ring-opening polymer of cyclopentene is preferably 5 to 90 wt %, more preferably 10 to 80 wt %, and furthermore preferably 20 to 70 wt % in the rubber components. By having the content ratio of the ring-opening polymer of cyclopentene within the range, it is possible to make the rubber composition favorable in moldability and excellent in low heat generation property.

If necessary, according to a common method, the rubber composition of the present invention may be also added with additives such as crosslinking agents, crosslinking accelerators, crosslinking activators, anti-aging agents, activators, process oils, plasticizers, lubricants, fillers, tackifying agents, and aluminum hydroxide, each in a required amount, in addition to the components described above.

As the crosslinking agent, sulfur, sulfur hydride, organic peroxides, quinone dioximes, an organic polyvalent amine compound, and an alkylphenol resin having a methylol group etc. may be mentioned. Of these, sulfur is preferably used. Addition amount of the crosslinking agent is preferably 1.0 to 5.0 parts by weight, more preferably 1.2 to 4.0 parts by weight, furthermore preferably 1.4 to 3.0 parts by weight, and most preferably 1.9 to 3.0 parts by weight with respect to 100 parts by weight of the rubber components that are contained in the rubber composition.

As the crosslinking accelerator, a sulfene amide-based crosslinking accelerator such as N-cyclohexyl-2-benzothiazyl sulfene amide, N-t-butyl-2-benzothiazol sulfene amide, N-oxyethylene-2-benzothiazol sulfene amide, N-oxyethylene-2-benzothiazol sulfene amide, and N,N'-diisopropyl-2-benzothiazol sulfene amide; a guanidine-based crosslinking accelerator such as diphenyl guanidine, diorthotolyl guanidine, and orthotolyl guanidine; a thiourea-based crosslinking accelerator; a thiazole-based crosslinking accelerator; a thiuram-based crosslinking accelerator; a dithiocarbamic acid-based crosslinking accelerator; and a xanthogenic acid-based crosslinking accelerator; etc. may be mentioned. Of these, it is particularly preferable that the sulfene amide-based crosslinking accelerator is contained. Each of the crosslinking accelerators may be used either singly or in combination of two or more. The addition amount of the crosslinking accelerator is preferably 0.1 to 15 parts by weight, more preferably 0.5 to 5 parts by weight, and particularly preferably 1.0 to 4.0 parts by weight with respect to 100 parts by weight of the rubber components that are contained in the rubber composition.

As the crosslinking activator, higher fatty acid such as stearic acid and zinc oxide. The addition amount of the crosslinking activator is, although not specifically limited, the addition amount when the higher fatty acid is used as a crosslinking activator is preferably 0.05 to 15 parts by weight, and more preferably 0.5 to 5 parts by weight with respect to 100 parts by weight of the rubber components that are contained in the rubber composition. The addition amount when the zinc oxide is used as a crosslinking activator is preferably 0.05 to 10 parts by weight, and more preferably 0.5 to 3 parts by weight with respect to 100 parts by weight of the rubber components that are contained in the rubber composition.

As the process oil, a petroleum based softening agent such as paraffin based one, aromatic based one, and naphthene based one; a plant based softening agent; and fatty acids; etc. may be mentioned.

As the additional additives, an activator such as diethylene glycol, polyethylene glycol, and silicone oil; a filler such as calcium carbonate, talc, and clay; a tackifying agent such as petroleum resin and cumaron rein; wax; etc. may be mentioned.

For obtaining the rubber composition of the present invention, each component is kneaded according to a common method. For example, by kneading the additives except crosslinking agents and crosslinking accelerators, fillers, and rubber components followed by adding crosslinking agents and crosslinking accelerators to the kneaded mixture, a desired composition can be obtained. The temperature for kneading the additives except crosslinking agents and crosslinking accelerators with the rubber components is preferably 80 to 200° C., and more preferably 120 to 180° C. Further, the kneading time is preferably 30 seconds to 30 minutes. Mixing of a kneaded mixture with crosslinking agents and crosslinking accelerators is generally performed after cooling to 100° C. or less, preferably 80° C. or less. Further, for obtaining the rubber composition of the present invention, any method of adding the additives and fillers to solid state rubber followed by kneading (dry kneading) and adding the additives and fillers to a solution of rubber followed by solidifying and drying (wet kneading) can be employed.

The ring-opening polymer of cyclopentene and rubber composition of the present invention have an excellent rubber property at low temperature, a low heat generation property, and processability (Mooney viscosity, in particular). For such reasons, based on such properties, the ring-opening polymer of cyclopentene and rubber composition of the present invention can be used for various applications, for example, several parts of a tire such as thread, carcass, side wall, and a bead part, rubber products such as hoses, window frames, belts, shoe soles, sound-damping rubbers, and automobile parts. It can be also used as resin reinforced rubbers for anti-shock polystyrene and ABS resin. Since the ring-opening polymer of cyclopentene and rubber composition of the present invention have excellent affinity and dispersity for a filler such as silica and carbon black, in particular, it can be preferably used for an application in which such filler is also used, in particular, for thread of a tire including all-season tires, high performance tires, and studless tires and also as materials for side wall, an under thread, carcass, and a bead part.

EXAMPLES

Below, the present invention will be explained further based on detailed examples, but the present invention is not limited to these examples. Further, below, the term "part" is based on weight, unless specifically described otherwise. Further, the test and evaluation were made according to the followings.

<Molecular Weight>

Molecular weight was determined in terms of polystyrene by performing gel permeation chromatography. Specifically, the measurements were made under the following conditions.

Measurement apparatus: High performance liquid chromatography (trade name: HLC-8220, made by TOSOH CORPORATION)

Column: two GMH-HR-H columns (trade name, made by TOSOH CORPORATION) were connected in series Detector: differential refractometer (trade name: RI-8220, made by TOSOH CORPORATION)

Elution liquid: tetrahydrofuran

Column temperature: 40° C.

<Cis/Trans Ratio>

Cis/trans ratio of the ring-opening polymer of cyclopentene was obtained by $^{13}$C-NMR spectrum measurement.

<Introduction Ratio of Active Hydrogen-Containing Functional Group>

According to $^{1}$H-NMR spectrum measurement of the ring-opening polymer of cyclopentene, integrated peak value originating from active hydrogen-containing functional group and integrated peak value originating from olefin were measured. Thereafter, based on the ratio of the measured peak integrated values and the result of number average molecular weight (Mn) measured by GPC as described above, the introduction ratio of active hydrogen-containing functional group was calculated. The introduction ratio of active hydrogen-containing functional group was defined as the ratio of the number of active hydrogen-containing functional group with respect to the number of the ring-opening polymer of cyclopentene chain. That is, active hydrogen-containing functional group introduction ratio of 100% represents a state in which one active hydrogen-containing functional group is introduced per one polymer chain.

<Mooney viscosity (ML$_{1+4}$, 100° C.)>

Mooney viscosity (ML$_{1+4}$, 100° C.) of the ring-opening polymer of cyclopentene was measured with reference to JIS K6300.

<Melting Point (Tm) and Glass Transition Temperature (Tg)>

Melting point (Tm) and glass transition temperature (Tg) of the ring-opening polymer of cyclopentene were measured by using a differential scanning calorimetry (DSC) with the temperature increase rate of 10° C./minute.

<Low Heat Generation Property>

The rubber composition was subjected to press crosslinking for 20 minutes at 150° C. to give a test specimen, which was then measured for tan δ at 60° C. by using a viscoelasticity measurement apparatus (trade name: EPLEXOR, made by Gabo Qualimeter) under the condition including initial deformation of 0.5%, dynamic deformation of 1%, and 10 Hz. When the measurement value of the sample of Comparative example 5 described later was 100, the obtained result was calculated as an index compared to it. Smaller index value indicates better low heat generation property.

Reference Example 1

Preparation of diisobutyl aluminum mono(n-hexoxide)/toluene solution (2.5 wt %)

Under the nitrogen atmosphere, 88 parts of toluene and 7.8 parts of 25.4 wt % of triisobutyl aluminum/n-hexane solution (made by TOSOH FINECHEM CORPORATION) were added to a glass vessel containing a stir bar. After cooling to −45° C., 1.02 parts of n-hexanol (the same molar amount as triisobutyl aluminum) were slowly added dropwise under vigorous stirring. After that, the mixture was kept under stirring until it reached the room temperature to prepare diisobutyl aluminum mono(n-hexoxide)/toluene solution (2.5 wt %) as the organoaluminum compound (a2) containing alkoxy group.

Example 1

Under the nitrogen atmosphere, 173 parts of toluene and 13.8 parts of 25.4 wt % of triisobutyl aluminum/n-hexane solution (made by TOSOH FINECHEM CORPORATION) as the alkyl aluminum (b2) were added to a glass vessel containing a stir bar. Subsequently, after cooling to −45° C., 1.27 parts of 3-buten-1-ol (the same molar amount as triisobutyl aluminum) as the olefin compound (b1) were slowly added dropwise under vigorous stirring. After that, the mixture was kept under stirring until it reached the room temperature to obtain the solution of the reactant (B) of triisobutyl aluminum and 3-buten-1-ol.

Subsequently, under the nitrogen atmosphere, 43 parts of 2.0 wt % of WCl$_6$/toluene solution as the compound (a1) of a transition metal belonging to Group 6 in the Periodic Table and 48 parts of the solution of the reactant (B) of triisobutyl aluminum and 3-buten-1-ol obtained above were added to a pressure resistant glass reaction vessel equipped with a stirrer and stirred for 10 minutes. Thereafter, as the oxygen atom-containing hydrocarbon compound (a3), 0.39 part of ethyl acetate were added thereto and stirred for 10 minutes. Subsequently, 150 parts of cyclopentene were added thereto and the polymerization reaction was allowed to occur for 6 hours at 25° C. After the polymerization reaction for 6 hours, an excess amount of isopropanol was added to the pressure resistant glass reaction vessel to terminate the reaction. The solution inside the pressure resistant glass reaction vessel was then poured over large excessive amount of isopropanol containing 2,6-di-t-butyl-p-cresol (BHT). Subsequently, precipitated polymer was collected, washed with isopropanol, and dried under vacuum at 40° C. for 3 days. As a result, 74 parts of the ring-opening polymer of cyclopentene were obtained.

40 parts of the ring-opening polymer of cyclopentene obtained above and 60 parts of natural rubber were masticated for 30 seconds in a Brabender type mixer (250 ml volume) and subsequently added with 30 parts of silica (ZEOSIL 1165MP, made by RHODIA) and 2.4 parts of a silane coupling agent (Si69, made by DEGUSSA). Next, with the initiation temperature for kneading of 110° C., the mixture was kneaded for 1.5 minutes and then added with 10 parts of process oil (ENERTHENE 1849A, made by British Petroleum), 20 parts of carbon black (SEAST KH, made by TOKAI CARBON Co., Ltd.), 3 parts of zinc oxide, 2 parts of stearic acid, and 2 parts of an anti-aging agent (NOCRAC 6C, made by OUCHI SHINKO CHEMICAL INDUSTRIAL CO., LTD.), and kneaded for 2 minutes. After the kneading is completed, the kneaded rubber mixture was discharged from the mixer. At the time of completion of kneading, temperature of the kneaded rubber mixture was 150° C. The kneaded rubber mixture obtained was cooled to room temperature and kneaded again in Brabender type mixer for 2 minutes with the initiation temperature for kneading of 110° C. After the kneading is completed, the kneaded rubber mixture was discharged from the mixer. Subsequently, by using 50° C. open roll, 1.5 parts of sulfur and 2 parts of a crosslinking accelerator (mixture of 1.5 parts of N-cyclohexyl-2-benzothiazyl sulfene amide and 0.5 part of diphenyl guanidine) were added and kneaded with the rubber mixture obtained. As a result, a sheet-shaped rubber composition was obtained.

Thereafter, the cyclopentene polymer obtained was tested in accordance with the above described method to measure molecular weight, cis/trans ratio, introduction ratio of the active hydrogen-containing functional group, Mooney viscosity (ML$_{1+4}$, 100° C.), melting point (Tm), and glass transition temperature (Tg). The rubber composition obtained was tested to measure the low heat generation property. The results are described in Table 1. Further, even after the cyclopentene polymer obtained was left in a −30° C. freezer for 3 days, it maintained the rubber state.

Example 2

Under the nitrogen atmosphere, 150 parts of cyclopentene and 3.5 parts of 25.4 wt % of triisobutyl aluminum/n-hexane solution (made by TOSOH FINECHEM CORPORATION) as the alkyl aluminum (b2) were added to a pressure resistant glass reaction vessel equipped with a stirrer. Subsequently, 0.45 part of 5-hexen-1-ol (the same molar amount as triisobutyl aluminum) as the olefin compound (b1) were slowly added dropwise thereto under vigorous stirring to obtain the solution containing cyclopentene and the reactant (B) of triisobutyl aluminum and 5-hexen-1-ol. Subsequently, 21 parts of 2.0 wt % of WCl$_6$/toluene solution as the compound (a1) of a transition metal belonging to Group 6 in the Periodic Table were added to the solution obtained and the polymerization reaction was allowed to occur for 6 hours at 25° C. After 6 hours of the polymerization reaction, termination of the polymerization reaction, recovery of the polymer, washing and vacuum drying were carried out in the same manner as Example 1 to obtain 62 parts of the ring-opening polymer of cyclopentene. Further, a rubber composition was also obtained in the same manner as Example 1. The cyclopentene polymer and the rubber composition obtained were evaluated in the same manner as Example 1. The results are described in Table 1. Further, even after the polymer obtained was left in a −30° C. freezer for 3 days, it maintained the rubber state.

Example 3

Under the nitrogen atmosphere, 173 parts of toluene and 13.8 parts of 25.4 wt % of triisobutyl aluminum/n-hexane solution (made by TOSOH FINECHEM CORPORATION) as the alkyl aluminum (b2) were added to a glass vessel containing a stir bar. Subsequently, after cooling to −45° C., 0.78 part of 2-butene-1,4-diol (½ molar amount compared to triisobutyl aluminum) as the olefin compound (b1) were slowly added dropwise thereto under vigorous stirring. After that, the mixture was kept under stirring until it reached the room temperature to obtain the solution of the reactant (B) of triisobutyl aluminum and 2-butene-1,4-diol.

Subsequently, under the nitrogen atmosphere, 150 parts of cyclopentene and 96 parts of solution of the reactant (B) of triisobutyl aluminum and 2-butene-1,4-diol obtained above were added to a pressure resistant glass reaction vessel equipped with a stirrer. Meanwhile, apart from this, 8.6 parts of 2.0 wt % of $WCl_6$/toluene solution as the compound (a1) of a transition metal belonging to Group 6 in the Periodic Table and 2.5 wt % of diisobutyl aluminum mono(n-hexoxide)/toluene solution as the organoaluminum compound (a2) containing alkoxy group, which has been prepared in the Reference example 1, were added to a glass vessel and stirred for 10 minutes. Next, as the oxygen atom-containing hydrocarbon compound (a3), 0.077 part of 1,4-dioxane were added thereto and stirred for 10 minutes to obtain a catalyst solution. Thereafter, the catalyst solution obtained was added to the above pressure resistant glass reaction vessel and the polymerization reaction was allowed to occur for 6 hours at 25° C. After 6 hours of the polymerization reaction, termination of the polymerization reaction, recovery of the polymer, washing, and vacuum drying were carried out in the same manner as the Example 1 to obtain 87 parts of the ring-opening polymer of cyclopentene. Further, a rubber composition was also obtained in the same manner as the Example 1. The cyclopentene polymer and the rubber composition obtained were evaluated in the same manner as the Example 1. The results are described in the Table 1. Further, even after the polymer obtained was left in a −30° C. freezer for 3 days, it maintained the rubber state.

Example 4

Except for, as the olefin compound (b1), using 2.36 parts of 2-allyl phenol (the same molar amount as triisobutyl aluminum) instead of 1.27 parts of 3-buten-1-ol (the same molar amount as triisobutyl aluminum), the same procedure was followed as in Example 1 to obtain 76 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Example 5

Except for, as the olefin compound (b1), using 1.05 parts of 4-aminostyrene (½ molar amount compared to triisobutyl aluminum) instead of 1.27 parts of 3-buten-1-ol (the same molar amount as triisobutyl aluminum), and not adding ethyl acetate, the same procedure was followed as in Example 1 to obtain 19 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Example 6

Except for, as the olefin compound (b1), using 2.36 parts of N-allyl aniline (the same molar amount as triisobutyl aluminum) instead of 0.78 part of 2-butene-1,4-diol (½ molar amount compared to triisobutyl aluminum), and not adding dioxane, the same procedure was followed as in Example 3 to obtain 13 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Example 7

Except for, as the olefin compound (b1), using 1.73 parts of 1,2-epoxy-5-hexene (the same molar amount as triisobutyl aluminum) instead of 1.27 parts of 3-buten-1-ol (the same molar amount as triisobutyl aluminum), and not adding ethyl acetate, the same procedure was followed as in Example 1 to obtain 99 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Example 8

Except for, as the olefin compound (b1), using 2.02 parts of allyl glycidyl ether (the same molar amount as triisobutyl aluminum) instead of 0.78 part of 2-butene-1,4-diol (½ molar amount compared to triisobutyl aluminum), and not adding dioxane, the same procedure was followed as in Example 3 to obtain 51 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Example 9

Except for further using 0.13 part of vinyl norbornene in addition to 150 parts of cyclopentene, the same procedure was followed as in Example 3 to obtain 55 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Comparative Example 1

The polymerization reaction was carried out in the same manner as Example 1 except that 25.4 wt % of a triisobutyl aluminum/n-hexane solution was not used. However, it was not able to obtain a polymer in Comparative example 1.

Comparative Example 2

The polymerization reaction was carried out in the same manner as Example 2 except that 25.4 wt % of a triisobutyl aluminum/n-hexane solution was not used. However, it was not able to obtain a polymer in Comparative example 2.

Comparative Example 3

The polymerization reaction was carried out in the same manner as Example 3 except that 25.4 wt % by weight of a triisobutyl aluminum/n-hexane solution was not used. However, it was not able to obtain a polymer in Comparative example 3.

Comparative Example 4

Under the nitrogen atmosphere, 150 parts of cyclopentene and 0.32 part of 3-buten-1-ol were added to a pressure resistant glass reaction vessel equipped with a stirrer. After that, a catalyst solution in which 0.094 part of 1,3-bis-(2,4,6-trimethylphenyl)-2-(imidazolidinylidene)(dichlorophenylmethylene)(tricyclohexylphosphine)ruthenium (so called, second generation Grubss catalyst) were dissolved in 10 parts of toluene was added thereto and the polymerization was allowed to occur for 6 hours at 25° C. Thereafter, termination of the polymerization reaction, recovery of the polymer, washing and vacuum drying were carried out in the same manner as Example 1 to obtain 120 parts of the ring-opening polymer of cyclopentene. Further, a rubber composition was also obtained in the same manner as Example 1. The cyclopentene polymer and the rubber composition obtained were evaluated in the same manner as Example 1. The results are described in Table 1. Further, after keeping the polymer obtained in a −30° C. freezer for 3 days, it was transformed into a resin state, and therefore it was found to be inappropriate for various uses as a rubber like a use in tire.

Comparative Example 5

Except for using 0.091 part of 1-hexene instead of 96 parts of the solution of the reactant (B) of triisobutyl aluminum and 2-butene-1,4-diol, the same procedure was followed as in Example 3 to obtain 100 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Comparative Example 6

Except for using 0.095 part of allyl ethyl ether instead of 96 parts of the solution of the reactant (B) of triisobutyl aluminum and 3-buten-1-ol, the same procedure was followed as in Example 1 to obtain 80 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, even after the polymer obtained was left in a −30° C. freezer for 3 days, it maintained the rubber state.

Comparative Example 7

Except for using 0.095 parts of allyl ethyl ether instead of 96 parts of the solution of the reactant (B) of triisobutyl aluminum and 3-buten-1-ol, the same procedure was followed as in Comparative example 4 to obtain 112 parts of the ring-opening polymer of cyclopentene. Further, a rubber composition was also obtained in the same manner as the Example 1. The cyclopentene polymer and the rubber composition obtained were evaluated in the same manner as the Example 1. The results are given in the Table 1. Further, after keeping the polymer obtained in a −30° C. freezer for 3 days, it was transformed into a resin state, and therefore it was found to be inappropriate for various uses as a rubber like a use in tire.

TABLE 1

| | Polymerization catalyst (A) | | | | | Ring opening-polymer of cyclopenten | | |
|---|---|---|---|---|---|---|---|---|
| | Compound (a1) of a transition metal belonging to Group 6 in the Periodic Table | Organoaluminum compound (a2) containing alkoxy group | Oxygen atom-containing hydrocarbon compound (a3) | Reactant (B) Olefin compound (b1)*3) | Alkyl aluminum (b2) | Weight average molecular weight (Mw) | Molecular weight distribution (Mw/Mn) | Cis/Trans ratio |
| Ex. 1 | WCl$_6$ | — | Ethyl acetate | 3-Buten-1-ol | (iBu)$_3$Al | 278,300 | 2.50 | 60/40 |
| Ex. 2 | WCl$_6$ | — | — | 5-Hexen-1-ol | (iBu)$_3$Al | 255,400 | 2.34 | 65/35 |
| Ex. 3 | WCl$_6$ | (iBu)$_2$Al(OnHex) | 1,4-Dioxane | 2-Buten-1,4-diol | (iBu)$_3$Al | 230,200 | 2.25 | 64/36 |
| Ex. 4 | WCl$_6$ | — | Ethyl acetate | 2-Allyl phenol | (iBu)$_3$Al | 226,200 | 2.90 | 55/45 |
| Ex. 5 | WCl$_6$ | — | — | 4-Aminostyrene | (iBu)$_3$Al | 281,600 | 2.24 | 52/48 |
| Ex. 6 | WCl$_6$ | ((iBu)$_2$Al(OnHex) | — | N-Allyl aniline | (iBu)$_3$Al | 331,100 | 2.15 | 66/44 |
| Ex. 7 | WCl$_6$ | — | — | 1,2-Epoxy-5-hexene | (iBu)$_3$Al | 297,200 | 2.22 | 63/47 |
| Ex. 8 | WCl$_6$ | (iBu)$_2$Al(OnHex) | — | Allyl glycidyl ether | (iBu)$_3$Al | 412,300 | 2.63 | 64/36 |
| Ex. 9*1) | WCl$_6$ | (iBu)$_2$Al(OnHex) | 1,4-Dioxane | 2-Buten-1,4-diol | (iBu)$_3$Al | 297,000 | 3.65 | 62/38 |
| Comp. Ex. 1 | WCl$_6$ | — | Ethyl acetate | 3-Buten-1-ol | — | Polymerization did not progress | | |
| Comp. Ex. 2 | WCl$_6$ | — | — | 5-Hexen-1-ol | — | Polymerization did not progress | | |
| Comp. Ex. 3 | WCl$_6$ | (iBu)$_2$Al(OnHex) | 1,4-Dioxane | 2-Buten-1,4-diol | — | Polymerization did not progress | | |
| Comp. Ex. 4 | Ru catalyst*2) | — | — | 3-Buten-1-ol | — | 112,000 | 1.45 | 17/83 |

TABLE 1-continued

| | | | | | | | | |
|---|---|---|---|---|---|---|---|---|
| Comp. Ex. 5 | WCl$_6$ | (iBu)$_2$Al(OnHex) | — | 1-Hexen | — | 291,100 | 2.05 | 65/35 |
| Comp. Ex. 6 | WCl$_6$ | (iBu)$_2$Al(OnHex) | — | Allyl ethyl ether | — | 275,200 | 1.85 | 65/35 |
| Comp. Ex. 7 | | Ru catalyst*[2] | — | Allyl ethyl ether | — | 210,800 | 1.55 | 16/84 |

| | Ring opening-polymer of cyclopenten | | | | | |
|---|---|---|---|---|---|---|
| | Type of functional group containing active hydrogen*[4] | Introduction ratio of functional group containing active hydrogen*[5] (%) | Mooney viscosity (ML$_{1+4}$, 100° C.) | Tg (° C.) | Tm (° C.) | Polymer state after 3 days at −30° C. | Rubber composition Low heat generation property (index) |
| Ex. 1 | —OH | 68 | | | | | 75 |
| Ex. 2 | —OH | 65 | 26 | −104 | Not observed | Rubber state | 80 |
| Ex. 3 | —OH | 140 | 46 | −104 | Not observed | Rubber state | 62 |
| Ex. 4 | —OH | 75 | 32 | −101 | Not observed | Rubber state | 72 |
| Ex. 5 | —NH$_2$ | 68 | 42 | −101 | Not observed | Rubber state | 67 |
| Ex. 6 | —NH—Ph | 58 | 39 | −105 | Not observed | Rubber state | 78 |
| Ex. 7 | —OH | 80 | 35 | −103 | Not observed | Rubber state | 68 |
| Ex. 8 | —OH | 43 | 52 | −103 | Not observed | Rubber state | 85 |
| Ex. 9*[1] | —OH | 132 | 56 | −102 | Not observed | Rubber state | 60 |
| Comp. Ex. 1 | | | Polymerization did not progress | | | | |
| Comp. Ex. 2 | | | Polymerization did not progress | | | | |
| Comp. Ex. 3 | | | Polymerization did not progress | | | | |
| Comp. Ex. 4 | —OH | 85 | 12 | −95 | 18 | Resin state | 95 |
| Comp. Ex. 5 | None | 0 | 18 | −104 | Not observed | Rubber state | 100 |
| Comp. Ex. 6 | —OEt | 95 | 17 | −103 | Not observed | Rubber state | 97 |
| Comp. Ex. 7 | —OEt | 100 | 16 | −94 | 14 | Resin state | 105 |

*[1]Example 9 is the same example as Example 3 excep that, in addition to cyclopentene, vinyl norbornene is used as a monomer for constituting the cyclopentene ring opened polymer.
*[2]As Ru catalyst, (1,3-dimethylimidazolidin-2-ylidene)(tricyclohexylphosphine)benzylidene ruthenium dichloride was used.
*[3]In Comparative examples 5, 6, and 7, 1-hexene or allyl ethyl ether was used instead of the olefin compound (b1).
*[4]In Comparative examples 6 and 7, it represented not a functional group containing active hydrogen but an ethoxy group.
*[5]In Comparative examples 6 and 7, it represented not the introduction ratio of a functional group containing active hydrogen but the introduction ratio of an ethoxy group.

As described in the Table 1, the ring-opening polymer of cyclopentene having a cis ratio of the cyclopentene-derived structural units of 30% or more, a weight average molecular weight (Mw) of 100,000 to 1,000,000, and carrying the active hydrogen-containing functional group (a functional group containing a structure represented by the general formula (1) or (2) given above) at an end of the polymer chain all had an excellent rubber property at low temperature (rubber state was maintained even under condition of −30° C. for 3 days) and an excellent low heat generation property. Further, having Mooney viscosity within the range of 20 to 150, and therefore it was found to have excellent processability (Examples 1 to 9).

Meanwhile, even if there was the active hydrogen-containing functional group at and end of the polymer chain, when a cis ratio of cyclopentene-derived structural units was less than 30%, the rubber property at low temperature and low heat generation property were deteriorated and also the Mooney viscosity was low, indicating poor processability (Comparative example 4).

Further, even if a cis ratio of cyclopentene-derived structural units was 30% or more, when the active hydrogen-containing functional group was not included at an end of the polymer chain, the low heat generation property was deteriorated and also the Mooney viscosity was low, indicating poor processability (Comparative example 5).

Further, when an ethoxy group was introduced to an end of the polymer chain instead of the active hydrogen-containing functional group, the low heat generation property was deteriorated and also the Mooney viscosity was low, indicating poor processability (Comparative examples 6 and 7).

Further, when the compound (a1) of a transition metal belonging to Group 6 in the Periodic Table and the olefin compound (b1) were used but the alkyl aluminum (b2) was not used, it was not able to obtain a polymer (Comparative examples 1 to 3).

The invention claimed is:

1. A ring-opening polymer of cyclopentene, wherein
a cis ratio of cyclopentene-derived structural units in the ring-opening polymer is 30% to 95%, a weight average molecular weight (Mw) is 100,000 to 1,000,000, and a functional group containing a structure represented by the following general formula (1) or (2) is included at an end of the polymer chain:

$$—Y—H \quad (1),$$

wherein Y represents an oxygen atom or a sulfur atom and

$$—NH\text{-}Q \quad (2),$$

wherein Q represents a hydrogen atom or a hydrocarbon group or a silyl group which may have a substituent group.

2. The ring-opening polymer of cyclopentene as set forth in claim 1, wherein the functional group is a hydroxy group, an amino group, or a monoarylamino group.

3. A method for producing a ring-opening polymer of cyclopentene, wherein
the ring-opening polymer of cyclopentene has cyclopentene-derived structural units, a cis ratio of the cyclopentene-derived structural units being 30 to 95%,
the ring-opening polymer of cyclopentene has weight average molecular weight (Mw) of 100,000 to 1,000,000,
the ring-opening polymer of cyclopentene has a functional group containing a structure represented by the following general formula (1) or (2) at an end of the polymer chain, and the ring-opening polymer of cyclopentene is obtained by using a polymerization catalyst (A) comprising, as a main catalyst, a compound (a1) of a transition metal belonging to Group 6 in the Periodic Table in the presence of a reactant (B) of an olefin compound (b1) having at least one substituent group selected from a functional group containing the structure represented by the general formula (1), a functional group containing the structure represented by the general formula (2), and an epoxy group, and an alkyl aluminum (b2) and, after the polymerization, terminating the polymerization reaction with alcohol or water:

$$—Y—H \quad (1),$$

wherein Y represents an oxygen atom or a sulfur atom and $$—NH-Q \quad (2),$$

wherein Q represents a hydrogen atom or a hydrocarbon group or a silyl group which may have a substituent group.

4. The method for producing the ring-opening polymer of cyclopentene as set forth in claim 3, wherein
the functional group containing the structure represented by the general formula (1) or (2) is a hydroxy group, an amino group, or a monoarylamino group.

5. The method for producing the ring-opening polymer of cyclopentene as set forth in claim 3, wherein the polymerization catalyst (A) further comprises an organoaluminum compound (a2) containing alkoxy group represented by the following general formula (3):

$$(R^1)_{3-x}Al(OR^2)_x \quad (3)$$

(in the general formula (3), $R^1$ and $R^2$ represent a hydrocarbon group having 1 to 20 carbon atoms and x satisfies the requirement $0<x<3$).

6. The method for producing the ring-opening polymer of cyclopentene as set forth in claim 4, wherein the polymerization catalyst (A) further comprises an organoaluminum compound (a2) containing alkoxy group represented by the following general formula (3):

$$(R^1)_{3-x}Al(OR^2)_x \quad (3)$$

(in the general formula (3), $R^1$ and $R^2$ represent a hydrocarbon group having 1 to 20 carbon atoms and x satisfies the requirement $0<x<3$).

7. A rubber composition obtained by adding a filler to a ring-opening polymer of cyclopentene, wherein
the ring-opening polymer of cyclopentene has cyclopentene-derived structural units, a cis ratio of the cyclopentene-derived structural units being 30 to 95%,
the ring-opening polymer of cyclopentene has weight average molecular weight (Mw) of 100,000 to 1,000,000,
the ring-opening polymer of cyclopentene has a functional group containing a structure represented by the following general formula (1) or (2) at an end of the polymer chain:

$$—Y—H \quad (1),$$

wherein Y represents an oxygen atom or a sulfur atom and $$—NH-Q \quad (2),$$

wherein Q represents a hydrogen atom or a hydrocarbon group or a silyl group which may have a substituent group.

8. The rubber composition as set forth in claim 7, wherein
the functional group containing the structure represented by the general formula (1) or (2) is a hydroxy group, an amino group, or a monoarylamino group.

9. The rubber composition as set forth in claim 7, wherein the filler is silica and/or carbon black.

10. The rubber composition as set forth in claim 8, wherein the filler is silica and/or carbon black.

* * * * *